June 18, 1940.  E. M. TRACKWELL  2,205,160
COMBINATION FRYER AND COOKER
Filed Nov. 27, 1939
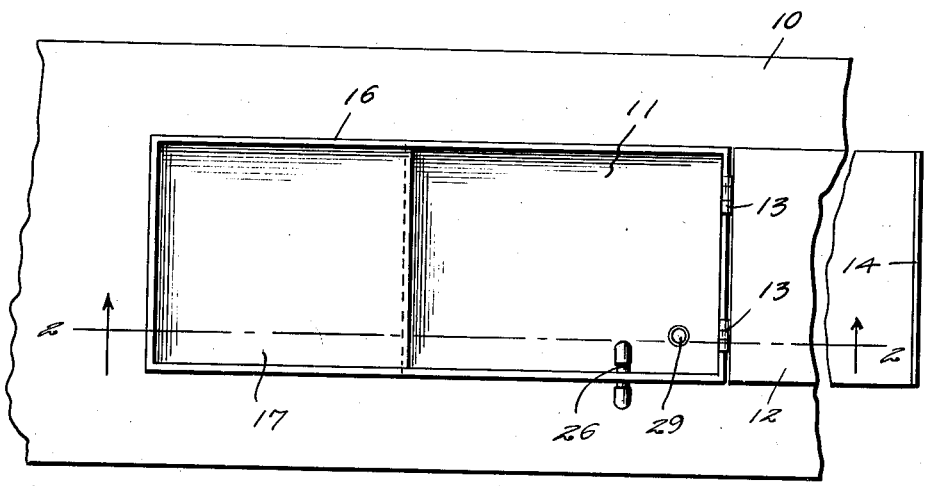
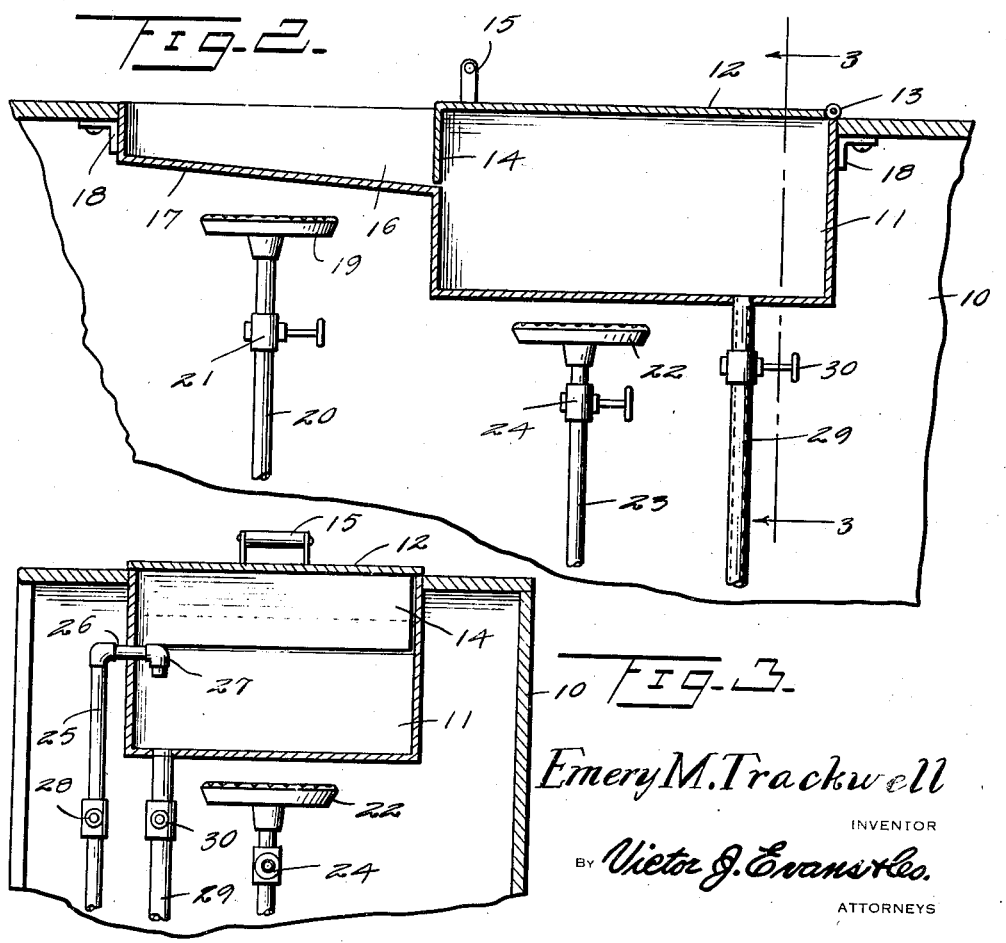
Emery M. Trackwell
INVENTOR
BY Victor J. Evans & Co.
ATTORNEYS Patented June 18, 1940

2,205,160

UNITED STATES PATENT OFFICE 2,205,160

COMBINATION FRYER AND COOKER

Emery M. Trackwell, Leavenworth, Kans.

Application November 27, 1939, Serial No. 306,402

2 Claims. (Cl. 53—7)

This invention relates to a combination fryer and cooker and has for an object to provide a device of this character which will be especially efficient in the cooking of hamburger steak as well as for cooking other meats.

A further object is to provide a device of this character including a cooking receptacle and a receptacle forming a griddle attached to the cooking receptacle, the griddle having a sloped bottom to drain grease or moisture from the griddle back into the cooling receptacle.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a top plan view of a combination fryer and steam cooker constructed in accordance with the invention.

Figure 2 is a longitudinal sectional view of the device taken on the line 2—2 of Figure 1.

Figure 3 is a cross sectional view of the device taken on the line 3—3 of Figure 2.

Referring now to the drawing in which like characters of reference designate similar parts in the various views, 10 designates a casing of any preferred type. In carrying out the invention a receptacle 11 is provided, the same being of substantially uniform depth and being closed at the top by a cover 12 which is hinged at one end as shown at 13 to one end wall of the receptacle. The cover is provided at the free end with a downwardly extending flange 14 which forms the upper half of the other end wall of the receptacle. A handle 15 is secured to the cover for opening and closing the cover.

A second receptacle 16 of substantially one-half of the depth of the receptacle 11 is formed integral with the receptacle 11 and is provided with an inclined bottom wall 17 which slopes toward the receptacle 11 and extends underneath and is spaced from the bottom of the flange 14 of the cover 12. Angular brackets 18 are secured to the receptacles and to the casing 10 for mounting the receptacles thereon.

A burner 19 is supported by an upstanding fuel supply pipe 20 underneath the bottom of the receptacle 16. The pipe is controlled by a valve 21. A burner 22 is supported underneath the bottom of the receptacle 11 by an upstanding fuel pipe 23 which latter is controlled by a valve 24.

An upstanding water pipe 25 is provided at the upper end with a lateral extension 26 which enters the receptacle 11 below the top thereof and is terminally equipped with a downwardly opening elbow 27 for supplying water to the receptacle 11. The water supply pipe is equipped with a valve 28. A drain pipe 29 opens through the bottom of the receptacle 11 and is controlled by a valve 30.

In one use of the device the bottom of the receptacle 11 may be used as a griddle or hotplate when the burner 22 is in operation to cook ground meat to be used for hamburger steak sandwiches. The cooked meat may be transferred from the receptacle 11 to the receptacle 16, the bottom of which forms a hotplate when the burner 19 is operated to fry the hamburger steak. Excess grease drains from the sloped bottom 17 of the receptacle 11 underneath the flange 14 back into the receptacle 11. If too much grease accumulates in the receptacle 11 it may be drained off by opening the drain valve 30.

In another use of the device water may be let into the receptacle 11 through the pipe 25 to a sufficient depth to form steam when the burner 22 is operated. Meat to be cooked by the steam may be placed in the receptacle 11, then transferred to the griddle 17 for warming and serving on the bun.

The casing 10 or metal forming the top of the cooker may be used for heating the bun before serving. The casing 10 receives heat from the burner 19 which is always burning.

From the above description it is thought that the construction and operation of the invention will be fully understood without further explanation.

What is claimed is:

1. A combined fryer and cooker comprising a casing, a cooking receptacle, a receptacle forming a griddle integral with the cooking receptacle, means securing the cooking receptacle and griddle within the casing, burners in the casing underneath the receptacle and the griddle, a cover for the cooking receptacle hinged at one end to the receptacle and having a flange of substantially one-half the depth of the receptacle forming the upper portion of an end wall of the receptacle, and a sloped bottom for the griddle extending underneath said flange and adapted to drain moisture and grease from the griddle into the cooking receptacle.

2. A combined fryer and cooker comprising a casing, a cooking receptacle in the casing having one end wall rising from the bottom of the receptacle to about one-half of the depth of the receptacle, a cover hinged at one end to the receptacle and having a depending flange at the opposite end extending downwardly toward said end wall of the receptacle, a griddle integral with the receptacle and having a sloped bottom extending underneath said flange to drain excess moisture and grease from the griddle into the receptacle, respective burners in the casing for the griddle and receptacle, a water supply pipe entering the receptacle, and a drain pipe entering the receptacle.

EMERY M. TRACKWELL.